(12) United States Patent
Schlesener et al.

(10) Patent No.: US 7,742,428 B1
(45) Date of Patent: Jun. 22, 2010

(54) DYNAMIC GATEWAY SELECTION

(75) Inventors: Matthew C Schlesener, Olathe, KS (US); Pallavur Sankaranaraynan, Overland Park, KS (US); Brian D Mauer, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1201 days.

(21) Appl. No.: 11/205,809

(22) Filed: Aug. 17, 2005

(51) Int. Cl.
 *H04L 12/26* (2006.01)
(52) U.S. Cl. .................. 370/250; 370/252; 375/224
(58) Field of Classification Search .............. 370/331, 370/353, 354, 241, 246, 250, 252; 455/445, 455/224; 375/224
 See application file for complete search history.

(56) References Cited

U.S. PATENT DOCUMENTS 6,973,313 B1 * 12/2005 Sebastian .................. 455/445

2004/0258239 A1 * 12/2004 Gallant et al. ............... 379/900

* cited by examiner

*Primary Examiner*—Donald L Mills
*Assistant Examiner*—Wanda Z Russell

(57) ABSTRACT

A communication network comprises a first gateway, a second gateway, a soft switch, and an end device. The end device transmits a first test message to the first gateway and transmits a second test message to the second gateway. The first gateway receives the first test message and transmits a first response message responsive to the first test message. The second gateway receives the second test message and transmits a second response message responsive to the second test message. The end device receives the first response message, receives the second response message, processes the first response message and the second response message to determine a preferred gateway of the first gateway and the second gateway, generates an update message indicating the preferred gateway, and transmits the update message to the soft switch.

20 Claims, 14 Drawing Sheets

DYNAMIC GATEWAY SELECTION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to telecommunication technologies, and in particular, to dynamic gateway selection processes for wireless telecommunications.

2. Description of the Prior Art

Legacy circuit switched telecommunication networks, such as the public switched telephone network (PSTN), typically provide very high reliability and quality of service. For instance, telephone calls can almost always be placed successfully. Once a call is established, the connection is clear and is rarely broken. One reason for these advantages is that the end points of circuit switched networks are fixed. A drawback is that fixed end points limit the flexibility of both carriers and customers.

In contrast, next generation packet networks are highly flexible as the end points are not fixed. For example, an end user can move from one access network to another using a mobile phone. In fact, a mobile phone in next generation networks need not only be conceived of as a wireless device. Rather, next generation phones can be plugged into to networks, such as through a broadband network connection. Next generation phones can also access networks through wireless mechanisms, such as WiFi hotspots. In these cases, and others, the end points change as the user roams across networks. A drawback to the flexible nature of next generation packet networks is that it is difficult to provide high quality service and reliability when the end points are constantly changing.

One example of the difficulty of providing reliable high quality service over packet networks involves the problem of gateway selection. Often times, a packet based service session includes an end point and a gateway. For instance, a standard voice over Internet Protocol (VoIP) voice call originates from an end point, such as a session initiation protocol (SIP) phone, and terminates to a destination on the PSTN. A gateway interfaces the originating packet network to the PSTN by interworking voice traffic between a packet format and a time division multiplexed (TDM) format.

During the call setup process, a soft switch selects the gateway to be used for the call based upon several methods, such as the open shortest path first (OSPF) method. The soft switch then caches the identity of the selected gateway with respect to the originating SIP phone. The next time the same SIP phone places a call to the PSTN, the same gateway is utilized. This is problematic because the quality of service provided on the previous call may not have been satisfactory. Furthermore, if the user has subsequently roamed to a new access point, the previous gateway may not even satisfy OSPF requirements. Thus, the current call could suffer from low quality of service due to an undesirable number of hops between the end device and the eventual gateway.

SUMMARY OF THE INVENTION

An embodiment of the invention helps solve the above problems and other problems by providing methods, systems, and software for gateway selection whereby reliable, high quality service sessions are ensured by having end devices test gateway related performance prior to establishing service sessions. In an embodiment of the invention, a communication network comprises a first gateway, a second gateway, a soft switch, and an end device. The end device is configured to transmit a first test message to the first gateway and transmit a second test message to the second gateway. The first gateway is configured to receive the first test message and transmit a first response message responsive to the first test message. The second gateway is configured to receive the second test message and transmit a second response message responsive to the second test message. The end device is further configured to receive the first response message, receive the second response message, process the first response message and the second response message to determine a preferred gateway of the first gateway and the second gateway, generate an update message indicating the preferred gateway, and transmit the update message to the soft switch. The soft switch is configured to receive the update message and responsively update a routing table to indicate the preferred gateway for the end device.

In an embodiment of the invention, the update message comprises a telephone routing over Internet protocol (TRIP) update message.

In an embodiment of the invention, the end device is configured to determine the preferred gateway based on the comparative latencies of the first response message and the second response message.

In an embodiment of the invention, the end device is configured to determine the preferred gateway based on the comparative jitter levels of the first response message and the second response message.

BRIEF DESCRIPTION OF THE DRAWINGS

The same reference number represents the same element on all drawings.

DETAILED DESCRIPTION OF THE PREFERRED EMBODIMENT

FIGS. 1-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 1-3

Figure 1:
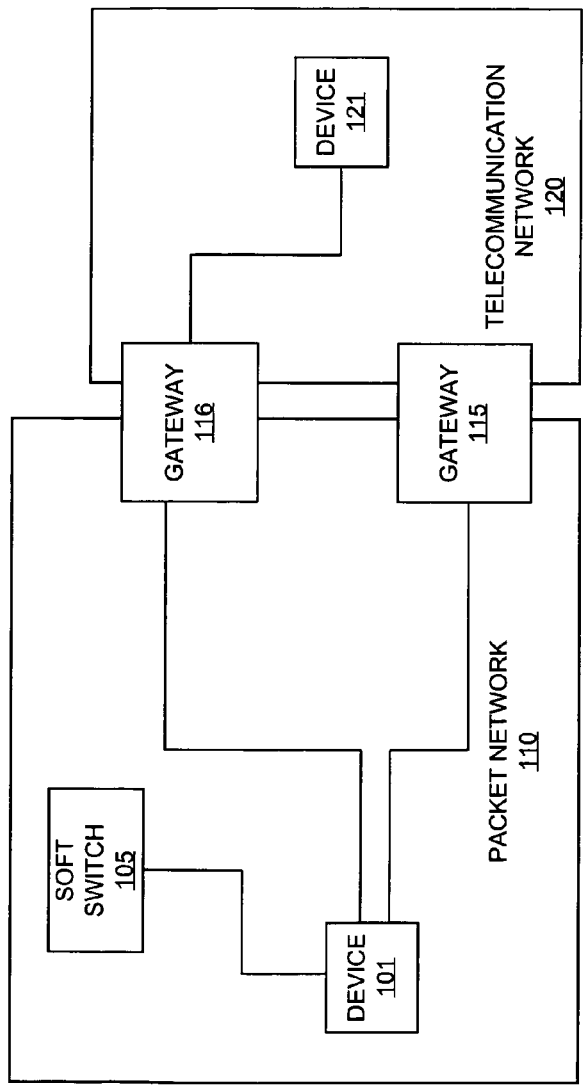
FIG. 1 illustrates a communication network in an embodiment of the invention.

FIG. 1 illustrates communication network 100 in an embodiment of the invention. Communication network 100 includes packet network 110 coupled to telecommunication network 120 by gateway 116 and gateway 115. Packet network 110 also includes soft switch 105 and device 101. Soft switch 105 is sometimes referred to by those skilled in the art as a media gateway controller or a location server, as well as by other names. Telecommunication network 120 includes device 121.

Gateway 116 interworks communications between different formats for packet network 110 and telecommunication network 120. For instance, gateway 116 could interwork packet traffic to time division multiplexed (TDM) traffic. In another example, gateway 116 could interwork traffic from one type of packet traffic to another type of packet traffic. Similarly, gateway 115 interworks communications between different formats for packet network 110 and telecommunication network 120.

It should be understood that device 101 could be considered an end device. An end device is typically considered any device that is the last node in a packet communication path. For instance gateways 116 and 115 could also be considered end devices as they reside at the edge of a packet network, packet network 110. End device 101 could be, for example, a wireless or wireline phone, a personal computing device, or a personal music or video device, as well as other types of devices. Device 101 could be capable of transmitting or receiving packet communications for a session, such as a voice or video over packet session, a music session, or the like.

In operation, device 101 is capable of initiating service sessions with device 121, such as a conventional SIP session. For example, device 101 could be a SIP phone and device 121 a telephone. In such a case, device 101 would transmit a SIP invite message to soft switch 105 indicating the PSTN phone number of device 121. Soft switch 105 would communicate with control elements of telecommunication network 120, such as the SS7 signaling system, to setup a voice call between device 101 and device 121. Soft switch 105 would also communicate with either gateway 116 or gateway 115 to establish a gateway for the session. The selected gateway would interwork packet traffic and TDM traffic for the session.

Figure 2:
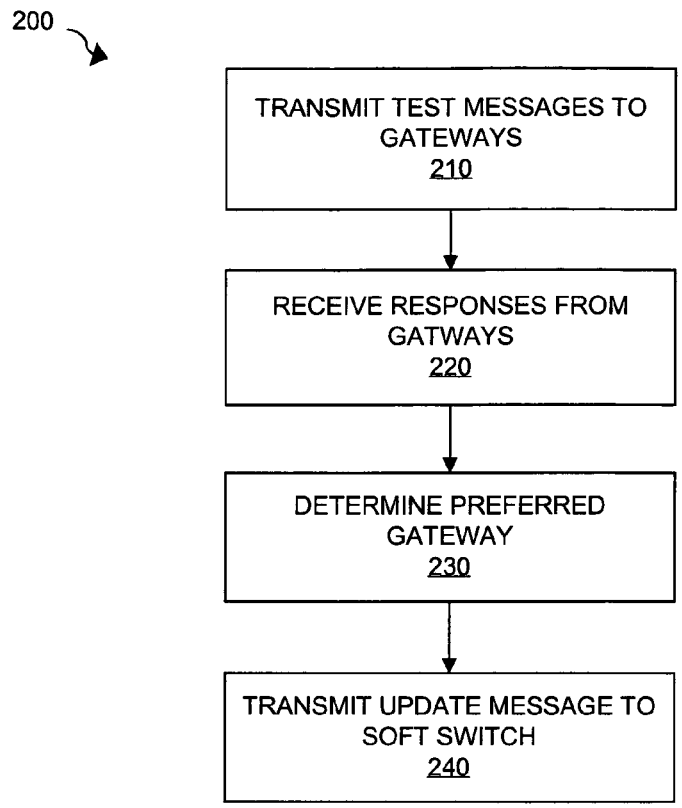
FIG. 2 illustrates the operation of a communication network in an embodiment of the invention.

As discussed in the background section, gateway selection in the prior art is often times based on cached information related to previous sessions established for device 101. For instance, the last PSTN call to device 101 might have been routed through gateway 116. Soft switch 105 might therefore select gateway 116 for the new session based upon the default cache information. In a departure from the prior art, FIG. 2 illustrates a gateway selection process executed by device 101 in an embodiment of the invention whereby multiple path or gateway performance is tested to ensure optimal gateway selection for a session.

To begin, device 101 transmits test messages to gateways 116 and 115 (Step 210). The test messages could be, for example, individual packets, packet streams, or file transfers, as well as other types of test messages. Both gateways 116 and 115 responsively return response message to device 101. Gateways 116 and 115 are typically conditioned to respond with response messages appropriate to the type of test message. Upon receiving the response messages (Step 220), device 101 processes the response messages to determine a preferred gateway of gateways 116 and 115. Lastly, device 101 transmits an update message to soft switch 105 indicating the preferred gateway.

Figure 3:
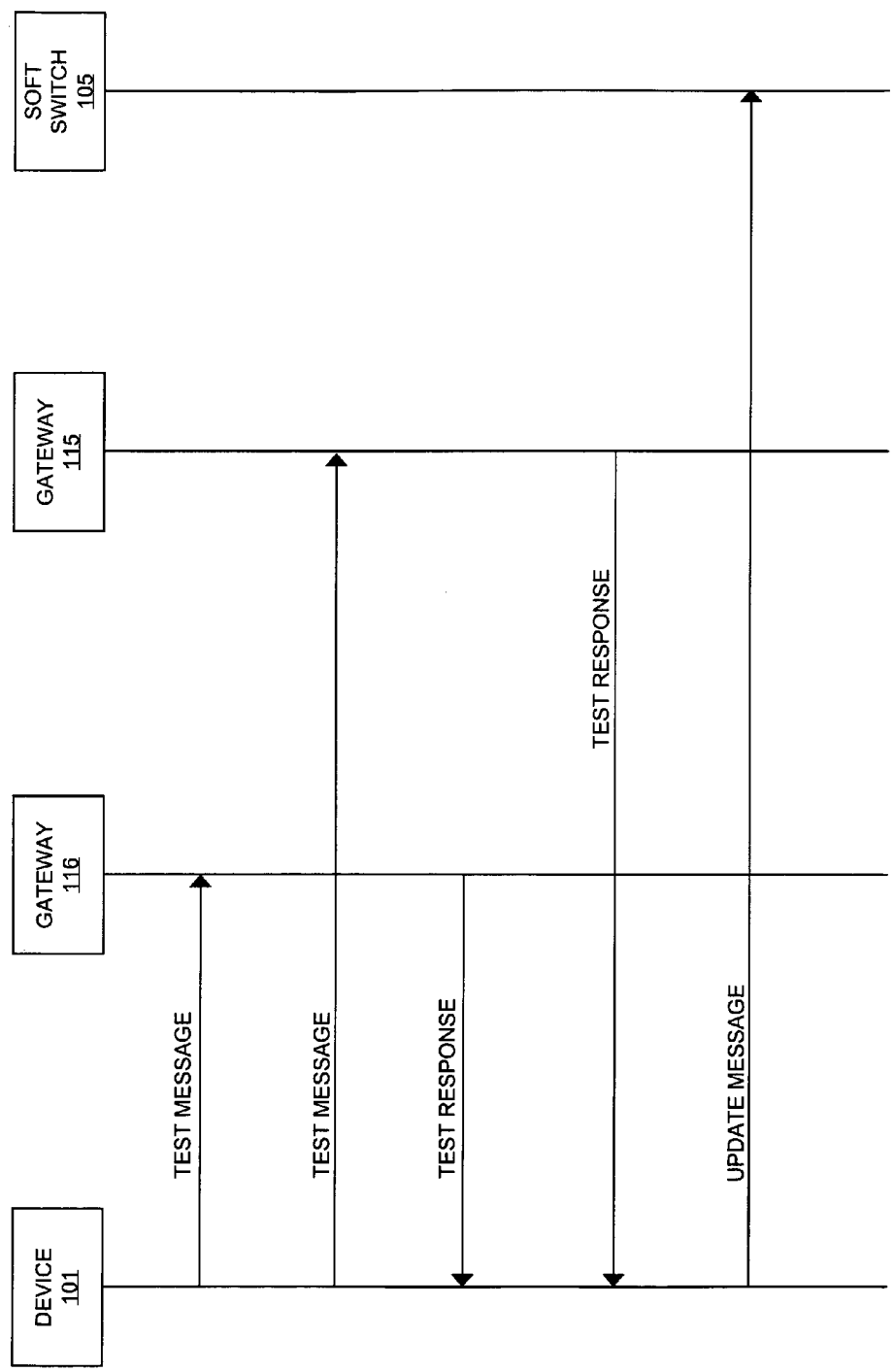
FIG. 3 illustrates the operation of a communication network in an embodiment of the invention.

FIG. 3 illustrates a message flow diagram further illustrating the gateway selection process in an embodiment of the invention. It should be understood that embodiments of the invention are not limited to the order of events illustrated in FIG. 2. To begin, device 101 transmits a first test message to gateway 116 and a second test message to gateway 115. In response to the first test message, gateway 116 transmits a first response message to device 101. In response to the second test message, gateway 115 transmits a second response message to device 101.

Device 101 receives both response messages and processes the messages to determine a preferred gateway of gateways 116 and 115. In one example, device 101 could determine the preferred gateway based on the comparative latencies of the first response message and the second response message. In another example, device 101 could determine the preferred gateway based on the comparative jitter levels of the first response message and the second response message. Next, device 101 generates an update message that indicates the preferred gateway, and transmits the update message to soft switch 105.

Upon receiving the update message, soft switch 105 could be configured to update a routing table to indicate the preferred gateway for device 101. Additionally, soft switch 105 could be further configured to transmit the preferred gateway information to other soft switches. In this manner, the identity of the currently preferred gateway for device 101 can be propagated through packet network 110 and to other packet service networks.

In an alternative, the gateway selection process could be performed by soft switch 105. In such a case, device 101 would process the first and second response message to generate performance information, such as latency or jitter statistics. The performance information could then be incorporated into the update message and sent to soft switch 105. Soft switch 105 would process the performance information to determine the preferred gateway.

Returning to the session setup discussion from above, soft switch 105 will select the preferred gateway that was identified in the update message. Assuming for exemplary purposes that gateway 115 is the preferred gateway, soft switch 105 will notify the control elements of telecommunication network 120 to establish a connection for the call between device 121 and gateway 115. Soft switch 105 will also transmit control instructions to gateway 115 identifying the session and the incoming trunk from telecommunication network 120 to use for the session. Additionally, the address of device 101 will most likely be identified in the control instructions.

During the service session, device 101 will transmit packet voice traffic to gateway 115. Gateway 115 will interwork the packet voice traffic to TDM voice traffic for device 122. In the opposite direction, TDM voice traffic will be carried to gateway 115 from device 122, and interworked to packet voice traffic for device 101.

Advantageously, communication network 100 provides for effective and efficient gateway selection whereby reliable, high quality service sessions are ensured by having end devices test gateway related performance prior to establishing service sessions. Further advantageously, an end device is no longer logically coupled to a single gateway session after session. Rather, an end device can search out the best gateway for the current circumstances.

Second Embodiment Configuration and Operation

FIGS. 4-8B

Figure 4A:
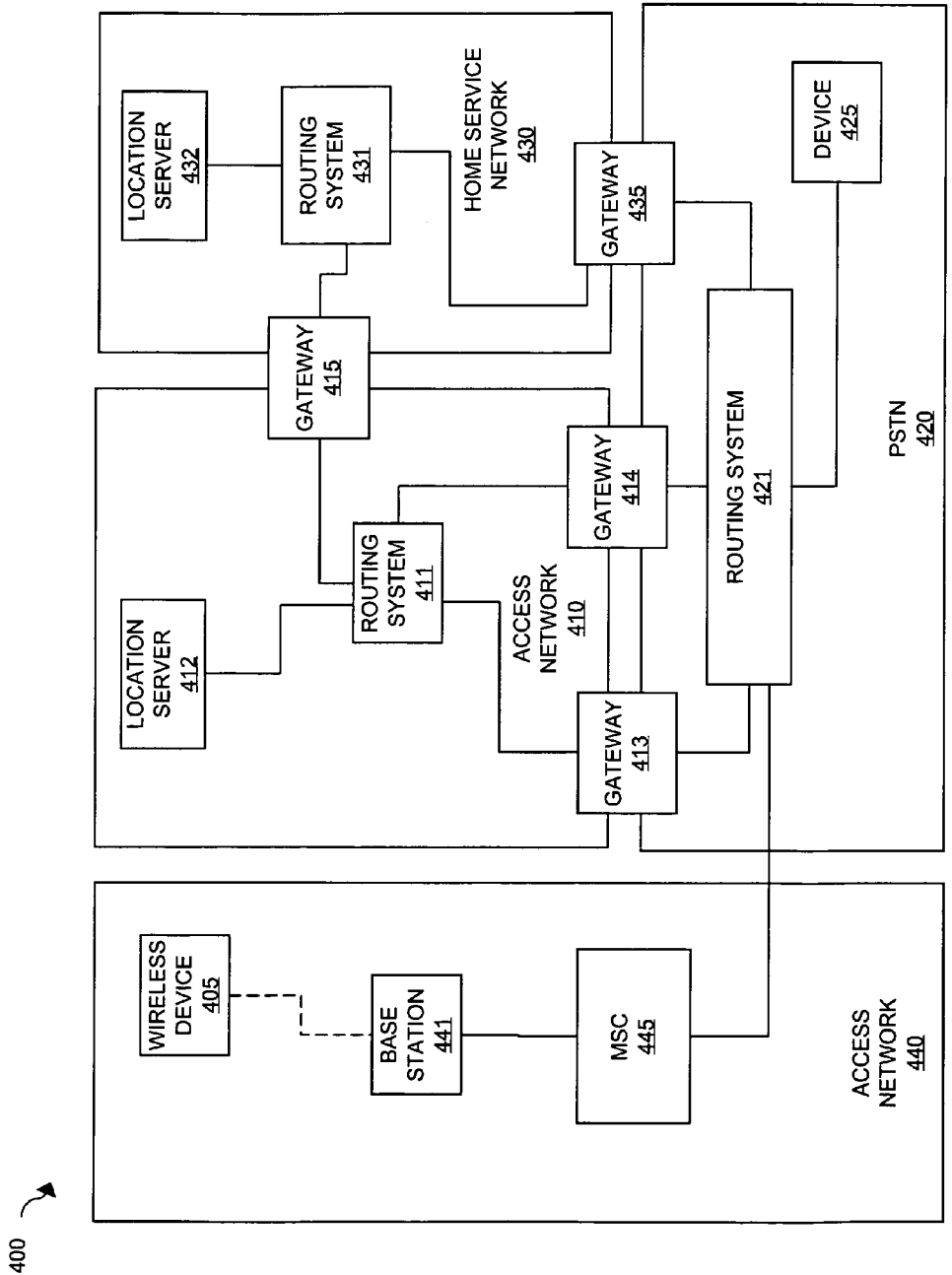
FIG. 4A illustrates a communication network in an embodiment of the invention.
Figure 4B:
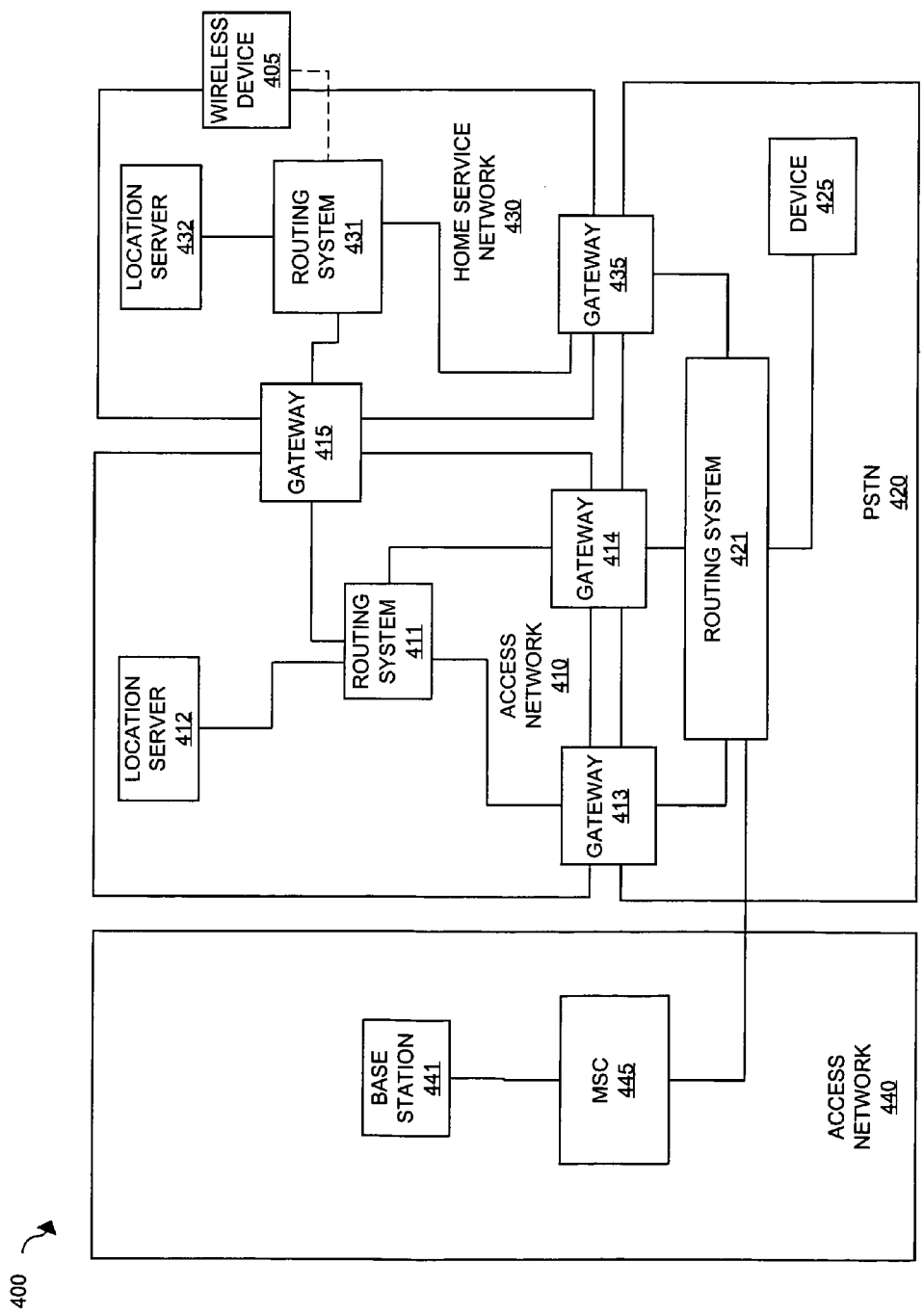
FIG. 4B illustrates a communication network in an embodiment of the invention.
Figure 4C:
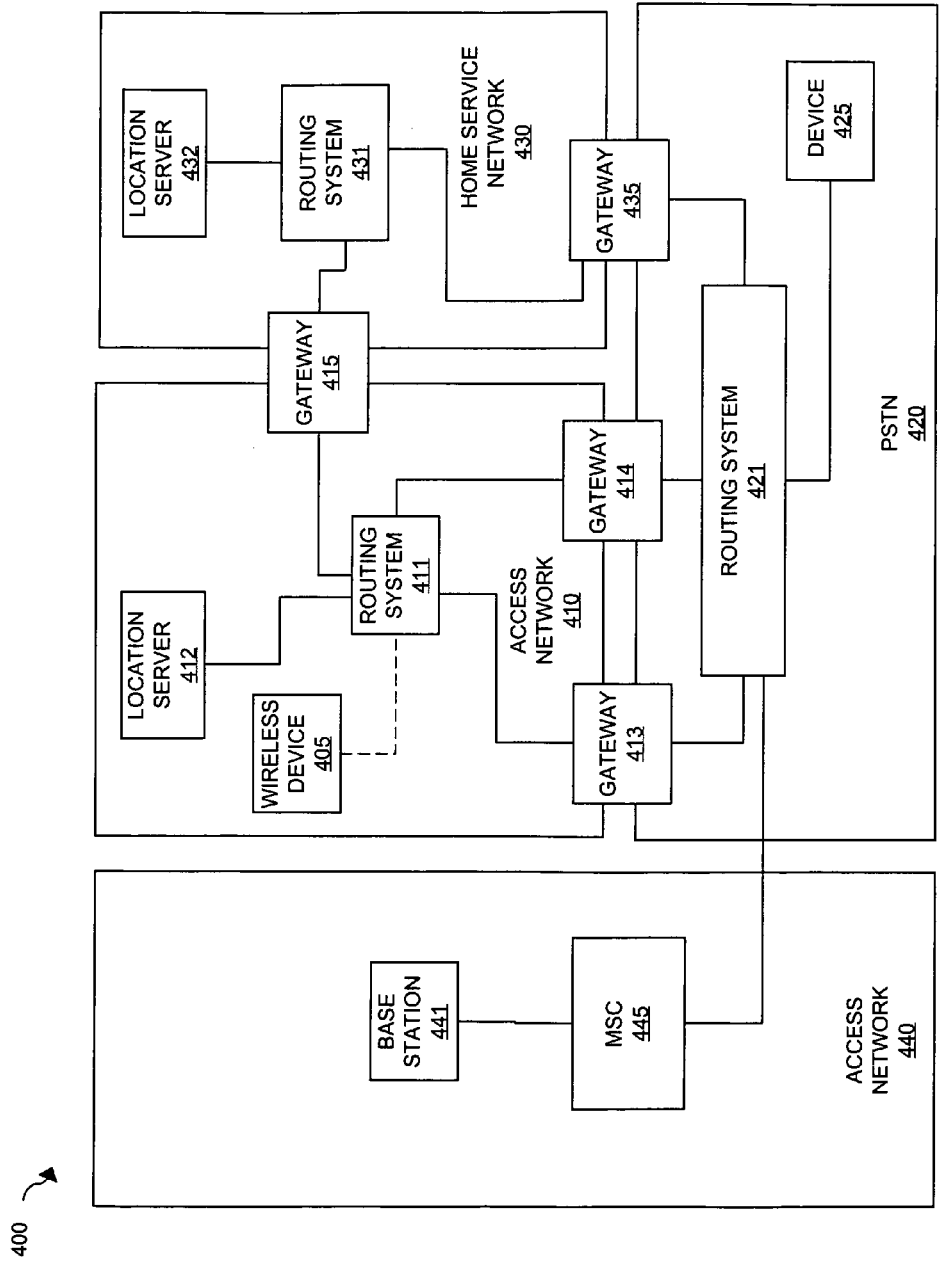
FIG. 4C illustrates a communication network in an embodiment of the invention.

FIGS. 4A-C illustrate communication network 400 in an embodiment of the invention. As is well known in the art, many communication networks, such as communication network 400, are composed of several interconnected sub-networks. In this case, communication network 400 includes home service network 430, access network 410, access network 440, and PSTN 420. Access network 440 could be, for example, a conventional CDMA or GSM communication network. Access network 410 could be a conventional packet based access network, such as the public Internet, an intranet, or other like networks. Home service network 430 could also be a conventional packet based access network similar to access network 410, except that wireless device 405 is considered homed to home service network 430.

Users communicate over communication network 400 in various ways. For, example, typical POTS calls can be placed from device 425. In another example, a user could use a standard mobile phone, such as a CDMA or GSM phone, to place or receive calls from access network 440. In a relatively recent advance, users are able to place and receive voice over packet (VoP) calls over access network 410 and home service network 430.

Users in access network 440 are typically able to roam wirelessly from base station to base station. Each base station is generally coupled to an MSC. In this case, MSC 445 performs call control operations and switching for devices in communication via base station 441. Furthermore, MSC 445 is typically coupled to the PSTN. As a user roams from base station to base station, the same MSC usually remains connected on the call. Thus, the same trunk connects the MSC to the PSTN. In FIG. 4, a trunk couples MSC 445 to routing system 421. Routing system 421 could include control and switching elements, such as call processing systems and switches.

Users are also able to roam wirelessly over access network 410 and home service network 430. For instance, a user could roam from one access point to the next access point. In addition, a user could roam from one network to the next. FIG. 4B illustrates wireless device 405 as operating in home service network 430, whereas FIG. 4C illustrates wireless device 405 as having roamed to access network 410. Access points are not pictured in FIGS. 4A-C for purposes of clarity. Depending upon the access technology used to gain access, such as WiFi or WiMax, access points could be considered hot spots. A typical access points includes a transceiver for transmitting and receiving communications to and from wireless devices, such as wireless device 405. An access point could be, for example, a base station.

As discussed in the background section above, users in the prior art are typically homed to one particular gateway. For instance, wireless device 405 will initially be homed to gateway 435 when making or receiving calls to and from PSTN 420. Further in the prior art, as wireless device 405 roams from home service network 430 to access network 410, wireless device 405 will remain homed to gateway 435. As a result, the path used for VoP sessions will traverse all three of gateway 415, routing system 431, and gateway 435. This could be problematic as the number of hops from the originating point to the destination could increase delay and latency.

Figure 5:
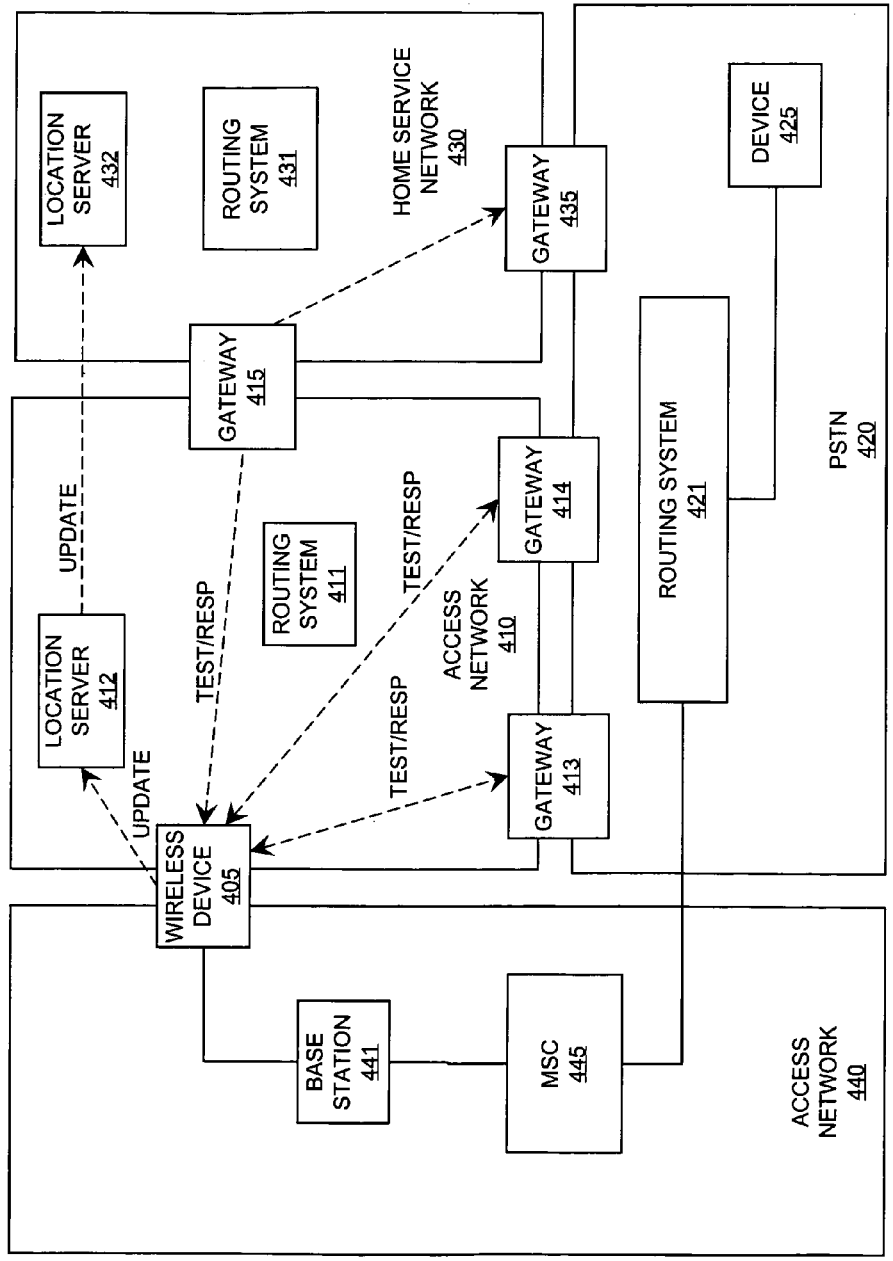
FIG. 5 illustrates the operation of a communication network in an embodiment of the invention.

FIG. 5 illustrates a gateway selection process in an embodiment of the invention whereby a roaming device, such as wireless device 405, is able to search out and select a preferred gateway. As illustrated by FIG. 5, wireless device 405 is roaming on access network 410. At any given time, wireless device 405 transmits test messages to gateway 413, gateway 414, and gateway 435 via gateway 415. Each gateway responsively transmits responses back to wireless device 405. Wireless device 405 processes the responses to determine performance information for each gateway. As a result, wireless device 405 can determine which gateway provides the best path for a particular call. Wireless device 405 then transmits an update message to location server 412. Location server 412 propagates the performance information by sending another update message to location server 432. In this manner, location server 432 will have updated information in the event that wireless device 405 roams back onto home service network 430, or in the event that a call is placed to wireless device 405.

Figure 6A:
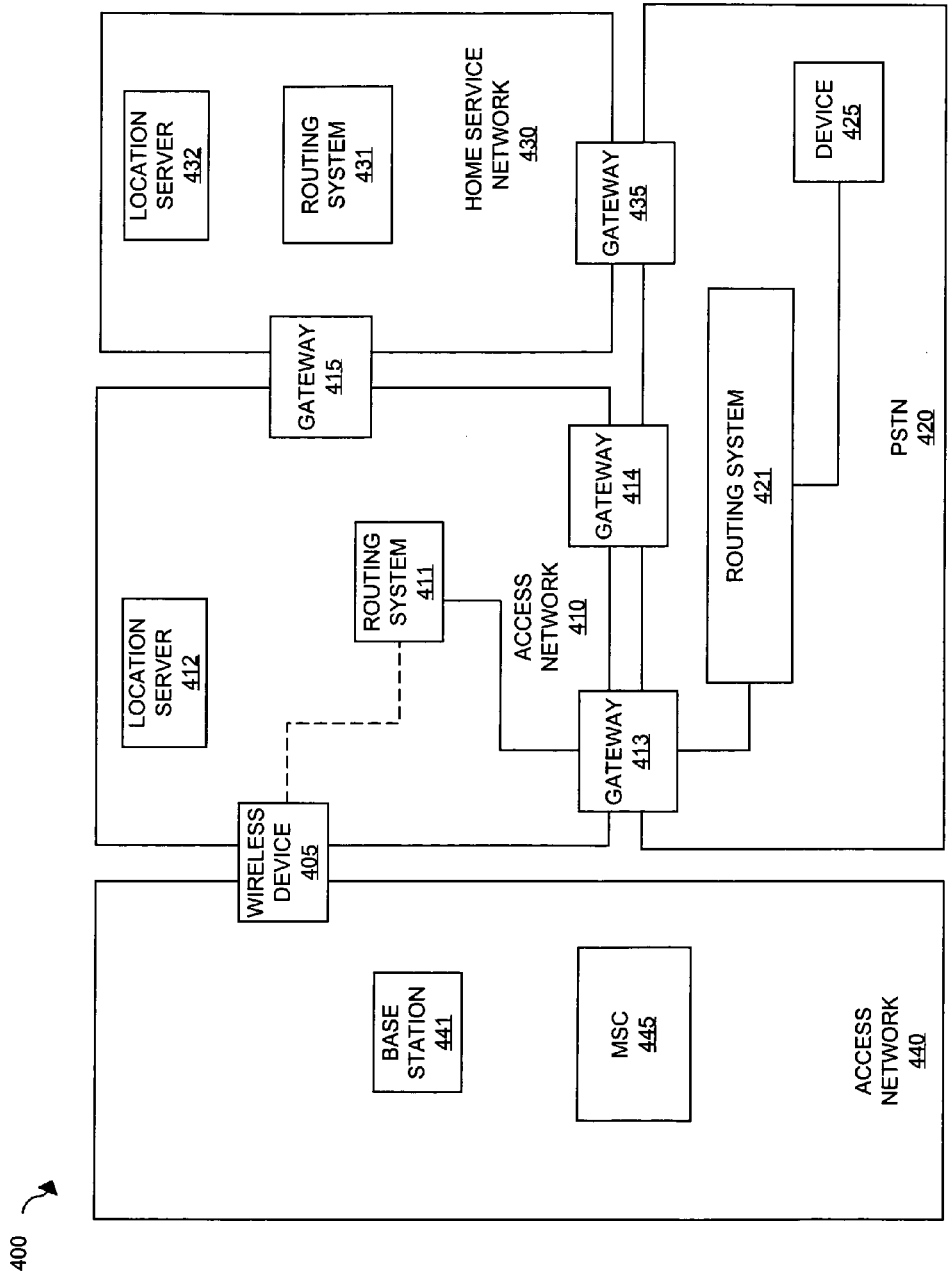
FIG. 6A illustrates the operation of a communication network in an embodiment of the invention.
Figure 6B:
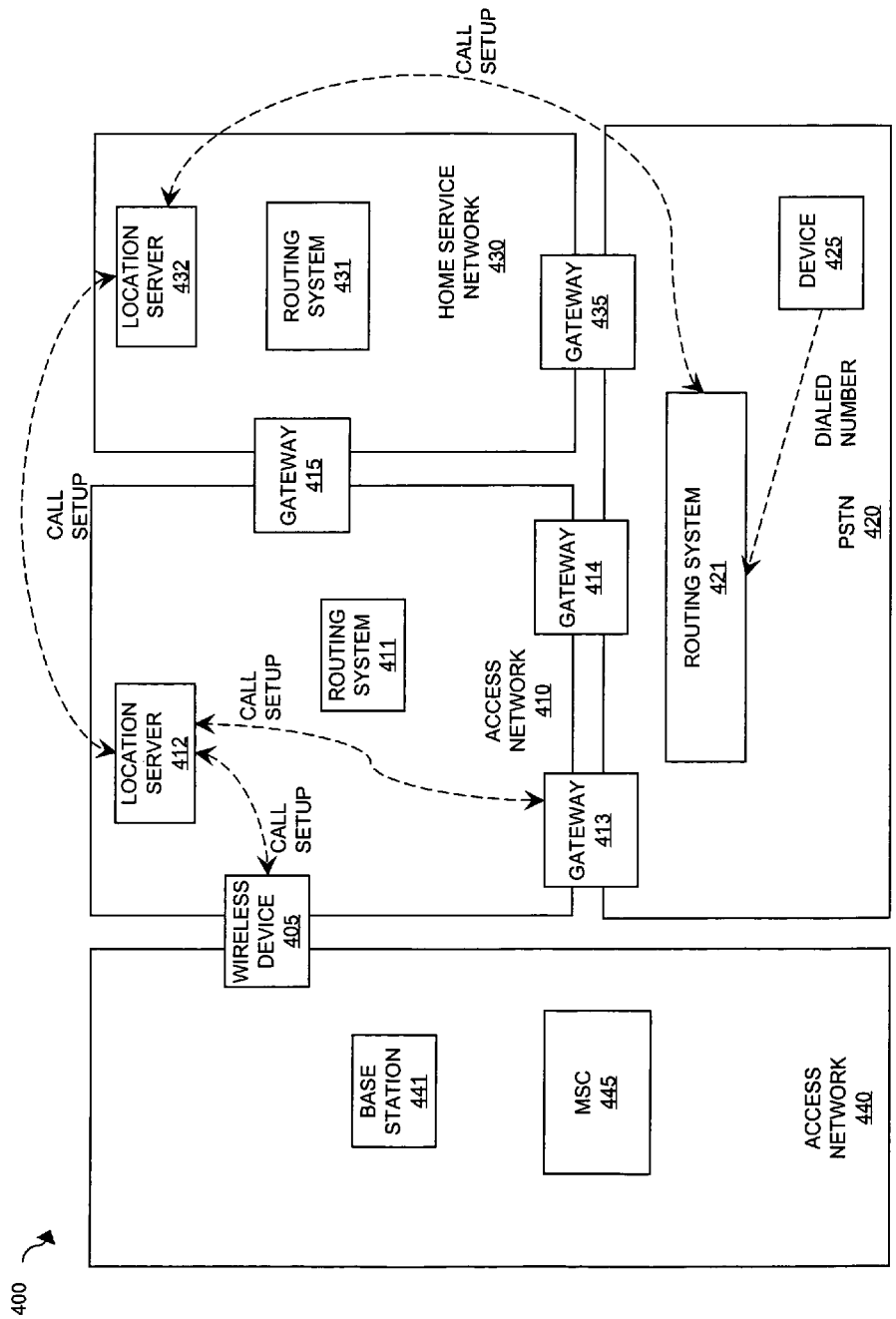
FIG. 6B illustrates the operation of a communication network in an embodiment of the invention.

FIG. 6A illustrates the path for a call between wireless device 405 and device 425 if gateway 413 were determined to be the preferred gateway. FIG. 6B illustrates the call setup signaling flow that would occur for such a call. Device 425 would first initiate the call by sending a dialed number to routing system 421. Routing system 421 would process the dialed number and determine that wireless device 405 belongs to home service network 430. In response, routing system 421 would transmit further call setup signaling to location server 432. Location server 432 would relay the call setup signaling to location server 412. Location server 412 would access a routing table to pick the appropriate gateway for the call. In this case, gateway 413 was previously determined to be the preferred gateway. As a result, call setup signaling is sent to gateway 413. Once the call setup process is complete, communications can commence between wireless device 405 and device 425 through gateway 413.

Figure 7A:
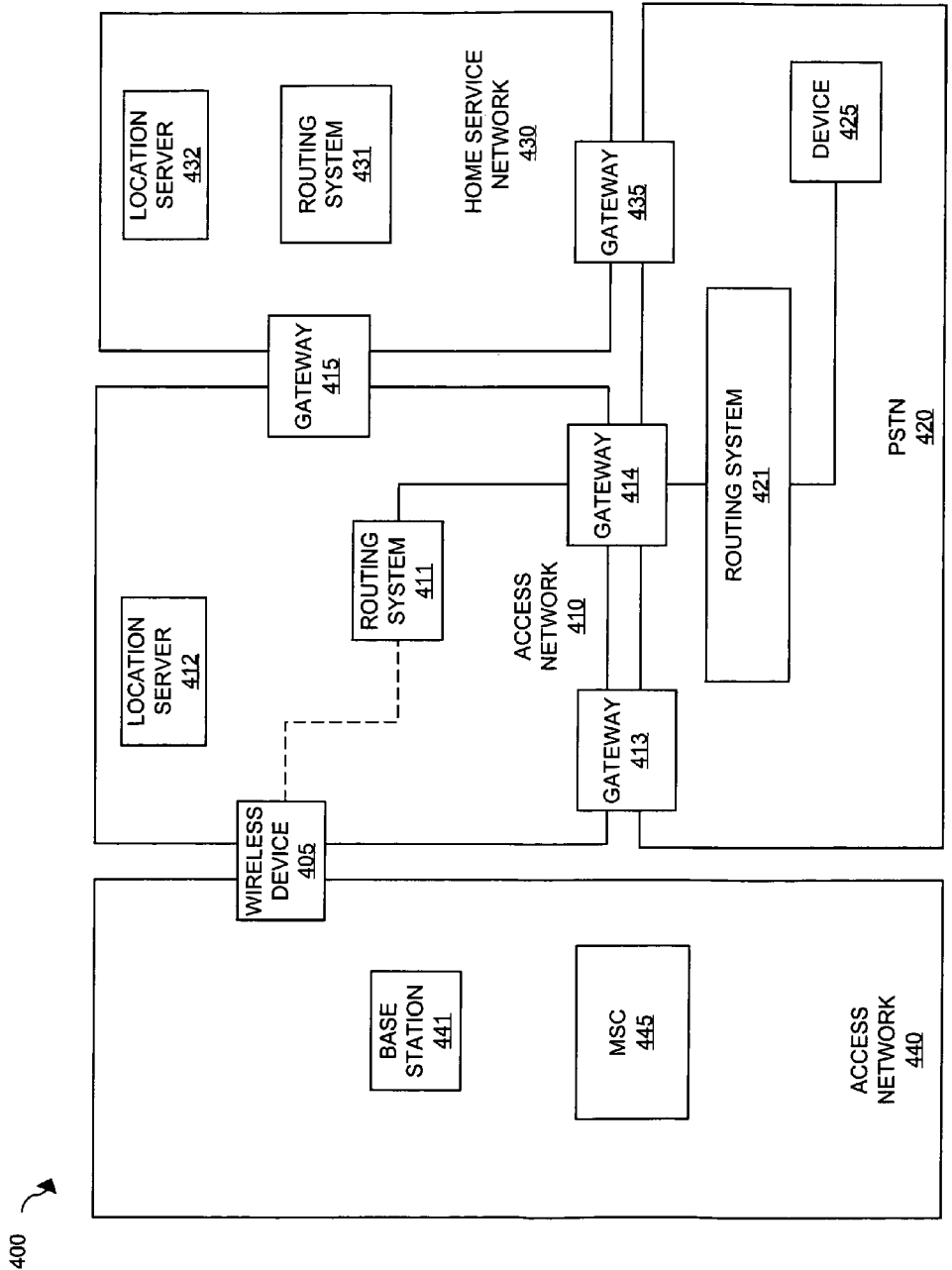
FIG. 7A illustrates the operation of a communication network in an embodiment of the invention.
Figure 7B:
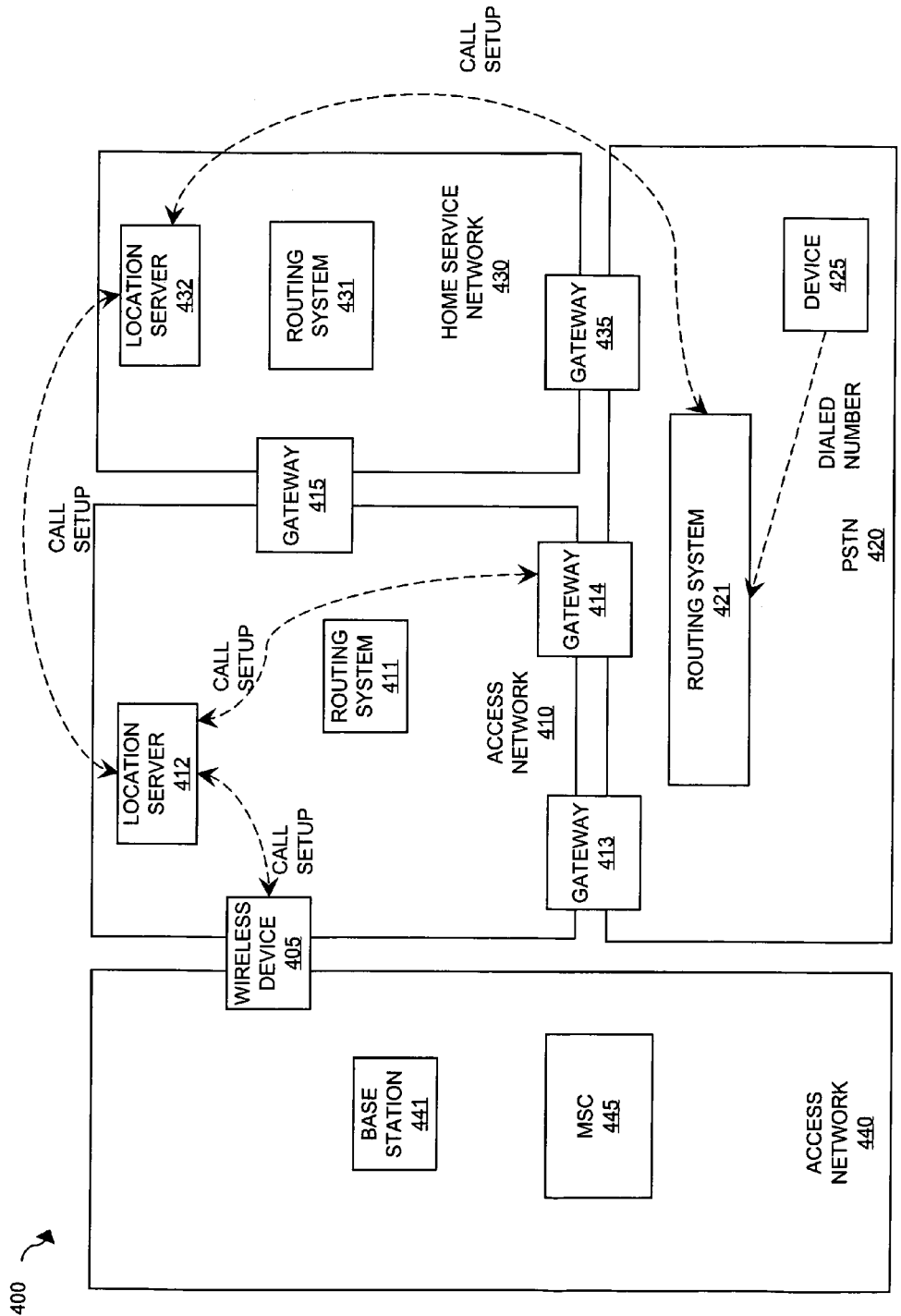
FIG. 7B illustrates the operation of a communication network in an embodiment of the invention.

FIG. 7A illustrates the path for a call between wireless device 405 and device 425 if gateway 414 were determined to be the preferred gateway. FIG. 7B illustrates the call setup signaling flow that would occur for such a call. Device 425 would first initiate the call by sending a dialed number to routing system 421. Routing system 421 would process the dialed number and determine that wireless device 405 belongs to home service network 430. In response, routing system 421 would transmit further call setup signaling to location server 432. Location server 432 would relay the call setup signaling to location server 412. Location server 412 would access a routing table to pick the appropriate gateway for the call. In this case, gateway 414 was previously determined to be the preferred gateway. As a result, call setup signaling is sent to gateway 414. Once the call setup process is complete, communications can commence between wireless device 405 and device 425 through gateway 414.

Figure 8A:
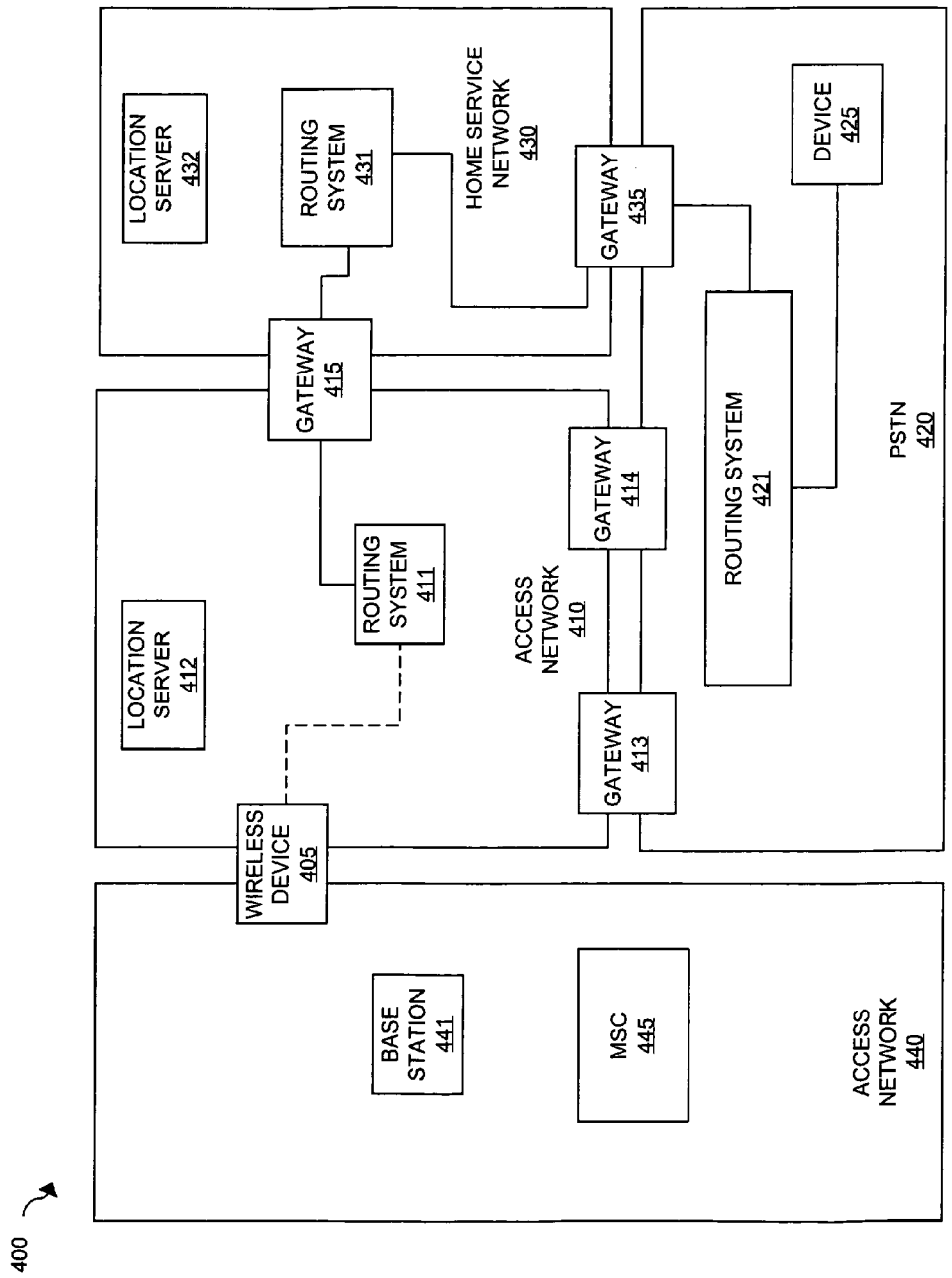
FIG. 8A illustrates the operation of a communication network in an embodiment of the invention.
Figure 8B:
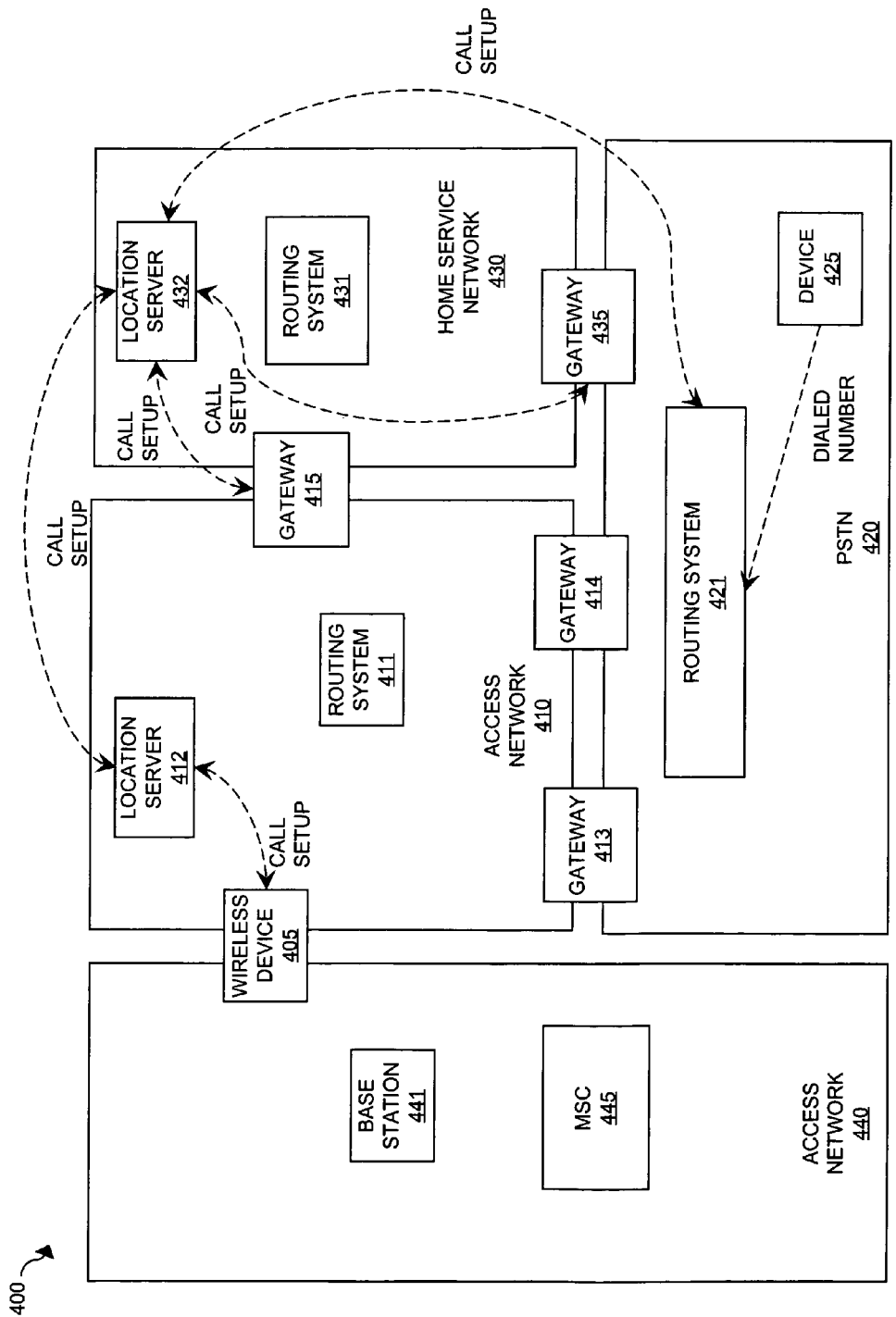
FIG. 8B illustrates the operation of a communication network in an embodiment of the invention.

FIG. 8A illustrates the path for a call between wireless device 405 and device 425 if gateway 435 were determined to be the preferred gateway. FIG. 8B illustrates the call setup signaling flow that would occur for such a call. Device 425 would first initiate the call by sending a dialed number to routing system 421. Routing system 421 would process the dialed number and determine that wireless device 405 belongs to home service network 430. In response, routing system 421 would transmit further call setup signaling to location server 432. Location server 432 would access a routing table to pick the appropriate gateway for the call. In this case, gateway 435 was previously determined to be the preferred gateway. As a result, call setup signaling is sent to gateway 435. Call setup signaling is also sent to location server 412, wireless device 405, and gateway 415. Once the call setup process is complete, communications can commence between wireless device 405 and device 425 through gateways 415 and 435.

It should be understood that a number of different protocols could be employed during the gateway selection process. Wireless device 405 could use a number of different mechanisms for generating and transmitting test messages. In another example, wireless device 405 could run a TRIP-lite client for generating and transmitting update messages to location servers 412 and 432. Likewise, location servers 412 and 432 could be TRIP servers, also sometimes referred to as TRIP speakers. Thus, location servers 412 and 432 can receive update messages from wireless device 405 and update other location servers using TRIP functions.

Advantageously, communication network 400 provides for effective and efficient gateway selection whereby reliable, high quality service sessions are ensured by having end devices test gateway related performance prior to establishing service sessions. Further advantageously, an end device is no longer logically coupled to a single gateway session after session. Rather, an end device can search out the best gateway for the current circumstances.

Figure 9:
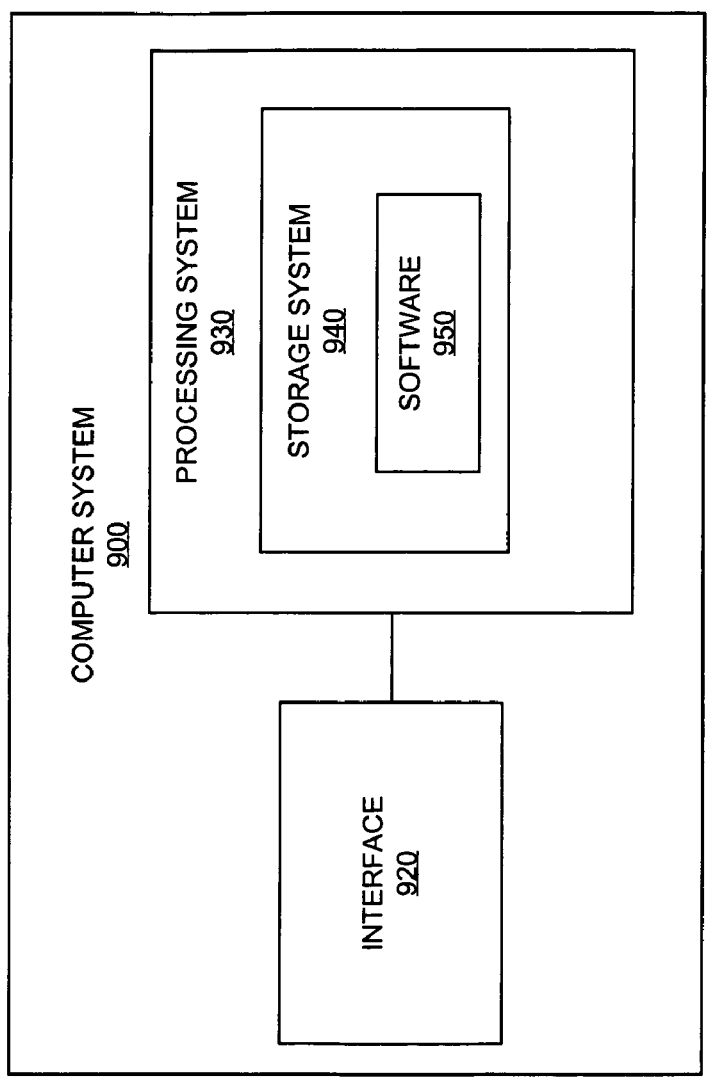
FIG. 9 illustrates a computer system in an embodiment of the invention.

Computer System—FIG. 9

FIG. 9 illustrates computer system 900 in an embodiment of the invention. Computer system 900 includes interface 920, processing system 930, storage system 940, and software 950. Storage system 940 stores software 950. Processing system 930 is linked to interface 920. Computer system 900 could be comprised of a programmed general-purpose computer, although those skilled in the art will appreciate that programmable or special purpose circuitry and equipment may be used. Computer system 900 may use a client server architecture where operations are distributed among a server system and client devices that together comprise elements 920-950.

Interface 920 could comprise a network interface card, modem, port, or some other communication device. Signaling interface 920 may be distributed among multiple communication devices. Interface 930 could comprise a computer microprocessor, logic circuit, or some other processing device. Processing system 930 may be distributed among multiple processing devices. Storage system 940 could comprise a disk, tape, integrated circuit, server, or some other memory device. Storage system 940 may be distributed among multiple memory devices.

Processing system 930 retrieves and executes software 950 from storage system 940. Software 950 may comprise an operating system, utilities, drivers, networking software, and other software typically loaded onto a general-purpose computer. Software 950 could also comprise an application program, firmware, or some other form of machine-readable processing instructions. When executed by the processing system 930, software 950 directs processing system 930 to operate as described for the elements of communication networks 100 and 400.

What is claimed is:

1. A communication device comprising:
an interface configured to transmit a first test message to a first gateway, transmit a second test message to a second gateway, receive a first response message from the first gateway, receive a second response message from the second gateway, and transmit an update message to a soft switch; and
a processing system configured to process the first response message and the second response message to determine a preferred gateway of the first gateway and the second gateway, and generate the update message indicating the preferred gateway;
the interface further configured to transmit a session invite message to the soft switch to initiate a service session through the preferred gateway.

2. The communication device of claim 1 wherein the update message comprises a telephone routing over Internet protocol (TRIP) update message.

3. The communication device of claim 1 wherein the processing system is configured to determine the preferred gateway based on the comparative latencies of the first response message and the second response message.

4. The communication device of claim 1 wherein the processing system is configured to determine the preferred gateway based on the comparative jitter levels of the first response message and the second response message.

5. A method of operating a communication device, the method comprising:
transmitting a first test message to a first gateway;
transmitting a second test message to a second gateway;
receiving a first response message from the first gateway;
receiving a second response message from the second gateway;
processing the first response message and the second response message to determine a preferred gateway of the first gateway and the second gateway;
generating an update message indicating the preferred gateway;
transmitting an update message to a soft switch; and
transmitting a session invite message to the soft switch to initiate a service session through the preferred gateway.

6. The method of claim 5 wherein the update message comprises a telephone routing over Internet protocol (TRIP) update message.

7. The method of claim 5 comprising determining the preferred gateway based on the comparative latencies of the first response message and the second response message.

8. The method of claim 5 comprising determining the preferred gateway based on the comparative jitter levels of the first response message and the second response message.

9. A communication network comprising:
a first gateway;
a second gateway;
a soft switch; and
an end device;

wherein the end device is configured to transmit a first test message to the first gateway and transmit a second test message to the second gateway;

wherein the first gateway is configured to receive the first test message and transmit a first response message responsive to the first test message;

wherein the second gateway is configured to receive the second test message and transmit a second response message responsive to the second test message;

wherein the end device is further configured to receive the first response message, receive the second response message, process the first response message and the second response message to determine a preferred gateway of the first gateway and the second gateway, generate an update message indicating the preferred gateway, transmit the update message to the soft switch, and transmit a session invite message to the soft switch to initiate a service session through the preferred gateway; and wherein the soft switch is configured to receive the update message and responsively update a routing table to indicate the preferred gateway for the end device.

10. The communication network of claim 9 wherein the update message comprises a telephone routing over Internet protocol (TRIP) update message.

11. The communication network of claim 9 wherein the end device is configured to determine the preferred gateway based on the comparative latencies of the first response message and the second response message.

12. The communication network of claim 9 wherein the end device is configured to determine the preferred gateway based on the comparative jitter levels of the first response message and the second response message.

13. A method of operating a communication network, the method comprising:

in an end device, transmitting a first test message to the first gateway and transmit a second test message to the second gateway;

in the first gateway, receiving the first test message and transmitting a first response message responsive to the first test message;

in the second gateway, receiving the second test message and transmitting a second response message responsive to the second test message;

in the end device, receiving the first response message, receiving the second response message, processing the first response message and the second response message to determine a preferred gateway of the first gateway and the second gateway, generating an update message indicating the preferred gateway, transmitting the update message to the soft switch, and transmitting a session invite message to the soft switch to initiate a service session through the preferred gateway; and in the soft switch, receiving the update message and responsively updating a routing table to indicate the preferred gateway for the end device.

14. The method of claim 13 wherein the update message comprises a telephone routing over Internet protocol (TRIP) update message.

15. The method of claim 13 comprising in the end device determining the preferred gateway based on the comparative latencies of the first response message and the second response message.

16. The method of claim 13 comprising in the end device determining the preferred gateway based on the comparative jitter levels of the first response message and the second response message.

17. A non-transitory computer readable storage medium comprising computer executable instructions, which when executed comprise:

transmit a first test message to a first gateway, transmit a second test message to a second gateway, receive a first response message from the first gateway, receive a second response message from the second gateway, process the first response message and the second response message to determine a preferred gateway of the first gateway and the second gateway, generate an update message indicating the preferred gateway, transmit the update message to a soft switch, and transmit a session invite message to the soft switch to initiate a service session through the preferred gateway.

18. The computer readable storage medium of claim 17 wherein the update message comprises a telephone routing over Internet protocol (TRIP) update message.

19. The computer readable storage medium of claim 17 wherein the storage medium is further to determine the preferred gateway based on the comparative latencies of the first response message and the second response message.

20. The computer readable storage medium of claim 17 wherein the storage medium is further to determine the preferred gateway based on the comparative jitter levels of the first response message and the second response message.

* * * * *